United States Patent [19]

Koppelman

[11] Patent Number: 5,769,908
[45] Date of Patent: Jun. 23, 1998

[54] METHOD AND APPARATUS FOR REDUCING THE BY-PRODUCT CONTENT OF CARBONACEOUS MATERIALS

[75] Inventor: Edward Koppelman, Encino, Calif.

[73] Assignee: KFX Inc., Denver, Colo.

[21] Appl. No.: 831,115

[22] Filed: Apr. 1, 1997

Related U.S. Application Data

[63] Continuation of Ser. No. 513,199, Aug. 9, 1995, abandoned.

[51] Int. Cl.⁶ ........................................ C10L 9/00
[52] U.S. Cl. .................. 44/621; 44/629; 422/200; 422/201; 422/307; 165/1
[58] Field of Search ........................... 44/620, 621, 629; 422/200, 201, 307; 165/1

[56] References Cited

U.S. PATENT DOCUMENTS

| | | |
|---|---|---|
| 2,897,054 | 7/1959 | Miley . |
| 3,520,067 | 7/1970 | Winegartner . |
| 4,052,168 | 10/1977 | Koppelman . |
| 4,089,656 | 5/1978 | Cole . |
| 4,285,140 | 8/1981 | van Raam et al. . |
| 4,505,211 | 3/1985 | Lamare . |
| 4,523,927 | 6/1985 | Kuge et al. . |
| 4,601,113 | 7/1986 | Draper et al. . |
| 4,626,258 | 12/1986 | Koppelman . |
| 4,980,029 | 12/1990 | Bolz et al. ............................. 202/105 |
| 5,071,447 | 12/1991 | Koppelman ............................. 44/621 |
| 5,290,523 | 3/1994 | Koppelman ............................. 422/201 |

FOREIGN PATENT DOCUMENTS 973589  11/1982  U.S.S.R. .

*Primary Examiner*—Jacqueline V. Howard
*Assistant Examiner*—Cephia D. Toomer
*Attorney, Agent, or Firm*—Harness, Dickey & Pierce, P.L.C.

[57] ABSTRACT

The present invention relates to various apparatuses and processes for treating carbonaceous materials to remove by-products therefrom. More particularly, the present invention relates to the treatment of carbonaceous materials by injecting an inert gas into the carbonaceous material under a vacuum or injecting steam into the carbonaceous material either with or without the vacuum being applied in a controlled manner to more consistently treat the charge of carbonaceous material.

15 Claims, 3 Drawing Sheets

METHOD AND APPARATUS FOR REDUCING THE BY-PRODUCT CONTENT OF CARBONACEOUS MATERIALS

This is a continuation of U.S. patent application Ser. No. 08/513,199, filed Aug. 9, 1995, now abandoned.

BACKGROUND OF THE INVENTION

The present invention is particularly applicable, but not necessarily restricted to methods of processing carbonaceous materials by injecting steam under pressure or under a vacuum, or both to reduce the content of undesirable by-products, and particularly sulfur, from the carbonaceous material. Typical of the methods to which the present invention is applicable is the treating of various naturally occurring carbonaceous materials, such as wood, peat or sub-bituminous coal, to render them more suitable as solid fuel.

A number of inventions relating to upgrading carbonaceous fuel have heretofore been used or proposed so as to render the carbonaceous fuel more suitable as a solid fuel. Many problems such as extensive costs, both in manufacturing and operating carbonaceous fuel upgrading systems, difficult and complex controls for enabling the operation of carbonaceous fuel upgrading systems and a general lack of flexibility and versatility of such equipment for adaptation for the processing of other materials at different temperatures and/or pressures are common.

While advances have been made in the art addressing many of the aforementioned concerns, heretofore, few systems have been proposed which relate to the use of condensing steam as a means for reducing the amount of by-products contained in the charge of carbonaceous materials. Of the known systems employing condensing steam, the apparatuses utilized generally do not include controls to insure that the carbonaceous material is treated in a consistent manner throughout substantially the entire charge. For example, U.S. Pat. No. 5,071,447, which issued to the inventor discloses methods and apparatuses for steam treating carbonaceous materials. Under the system disclosed in the '447 patent, steam is injected at the top of the processor but no controls are in place for directing the introduction of steam. Thus, the steam condenses on the first material it comes in contact with. This, in turn, causes additional steam introduced into the system to follow the path of least resistance throughout the material resulting in an uneven distribution of condensing steam which results in an inconsistently processed material.

The methods and apparatuses of the present invention overcome many of the problems and disadvantages associated with prior art equipment and techniques by providing units which are of relatively simple design, have a durable construction, are versatile in use and are readily adaptable for processing different feed materials under varying temperatures and/or pressures. The apparatuses of the present invention are further characterized as being simple to control and efficient in the utilization of heat energy, thereby providing for economical operation and a conservation of resources.

Perhaps most importantly, the apparatuses and methods of the present invention are specifically directed to a more consistent treatment of the carbonaceous material throughout the whole of the charge. By providing an injector which evenly distributes the steam at the time of introduction and either internal tubes or a divider depending upon the heat exchanger embodiment, more consistent treatment of the carbonaceous materials is possible.

SUMMARY OF THE INVENTION

The benefits and advantages of the present invention are achieved by the following methods in which, under a first method, carbonaceous materials are charged into a heat exchanging apparatus comprising at least one internal tube for receiving the carbonaceous material surrounded by an outer casing. After the carbonaceous material is charged into the heat exchanging apparatus, the carbonaceous material is generally subjected to a vacuum. While the internal tube(s) containing the carbonaceous material are subjected to a vacuum, a heat exchange medium having a temperature of between approximately 250° F. to about 1200° F. and generally about 750° F. is circulated throughout the casing such that the heat exchange medium is in contact with the outer periphery of the internal tube(s). After the carbonaceous material reaches a predetermined temperature, steam is injected into the internal tube(s) such that the steam condenses on the carbonaceous material under vacuum. The temperature of the carbonaceous material remains elevated for a controlled period of time after the steam is injected to purge the material of various by-products. By-products, such as tar and particularly sulfur, which have been driven from the carbonaceous material are recovered along with water through a valve located at the bottom of the heat exchanger. At the conclusion of the heat exchange step, the carbonaceous material is removed from the heat exchanger for further processing or storage.

Under an alternative embodiment and method of the present invention, rather than charging the carbonaceous material into various internal tubes, the casing is provided with an internal chamber for receiving the carbonaceous materials. The internal chamber is separated into various elongated, generally linear sections or "quadrants" by a divider which typically extends the entire length of the chamber. After the carbonaceous material has been charged into the chamber and the chamber is sealed, the carbonaceous material is again generally subjected to a vacuum and thereafter, injected with steam for a predetermined period of time to purge the material of undesired by-products.

One major advantage of the present invention over the systems for treating carbonaceous materials which are known is that the apparatuses and methods of the present invention specifically control the introduction of steam to give rise to a more consistent final product.

BRIEF DESCRIPTION OF THE DRAWINGS

Additional benefits and advantages of the present invention will become apparent from a reading of the description of the preferred embodiments taken in conjunction with the specific examples provided and the drawings, in which.

DETAILED DESCRIPTION OF THE PREFERRED EMBODIMENTS

The present invention is useful for purging undesirable by-products such as sulfur from carbonaceous materials, including but not limited to, ground coal, lignite and sub-bituminous coals of the type broadly ranging between wood, peat and bituminous coals which are generally found in deposits similar to ground coal. Carbonaceous materials as mined, however, generally include a certain amount of undesirable contaminants, otherwise referred to herein as by-products, which have little, if any, value as a fuel source. Thus, it is highly desirable to remove as many of the by-products as possible to obtain a high energy fuel.

It is important to note from the onset that the particle size of the carbonaceous material which is subjected to treatment as described herein in large part determines the time necessary to remove the by-products from the carbonaceous material. In general, the larger the particle size the more time it takes to accomplish a reduction in the undesirable by-products of the carbonaceous material. Therefore, close attention should be paid to the particle size when carrying out the methods of the present invention.

Figure 1:
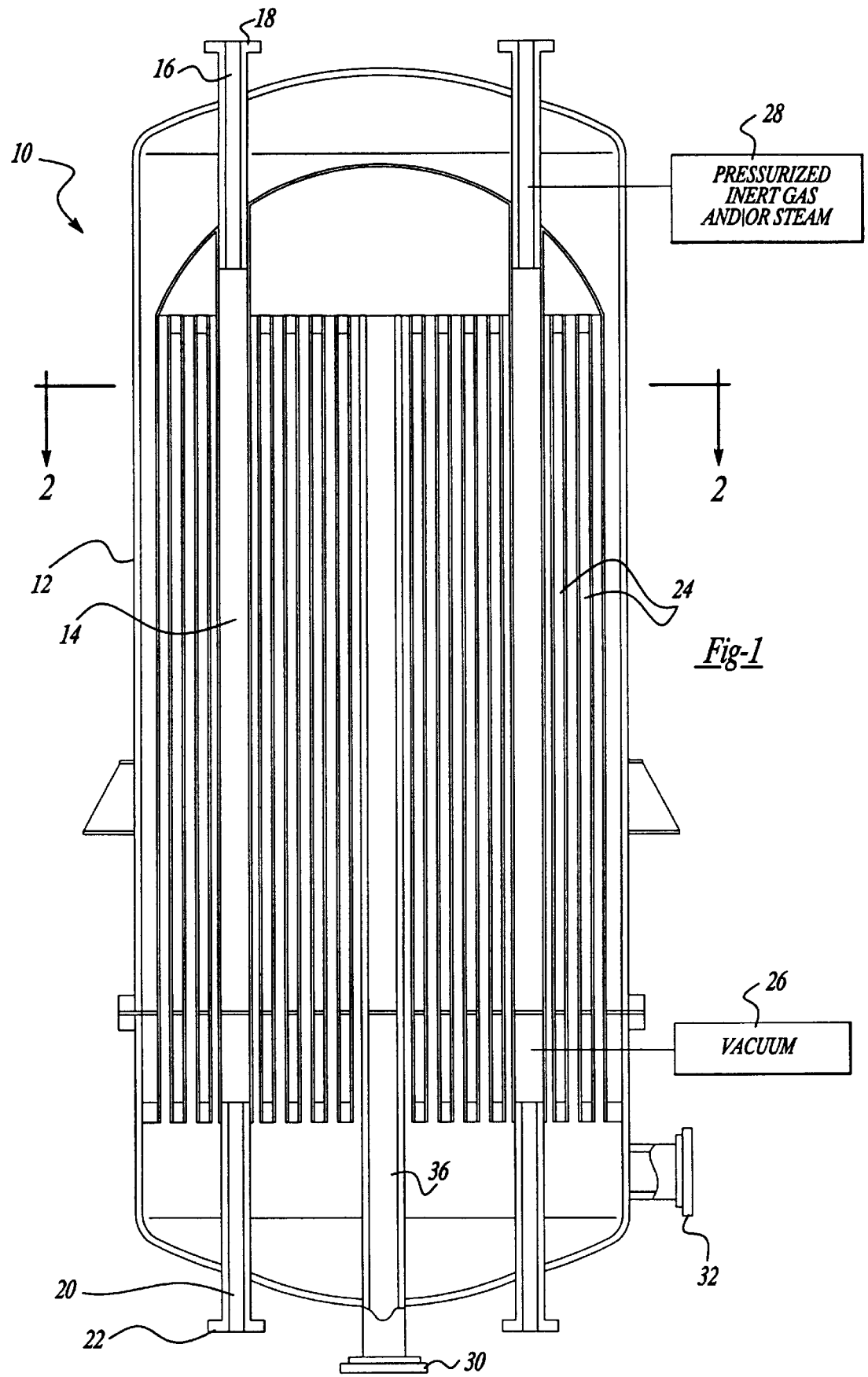
FIG. 1 is a side elevation view of a first heat exchanger embodiment in accordance with the teachings of the present invention.
Figure 2:
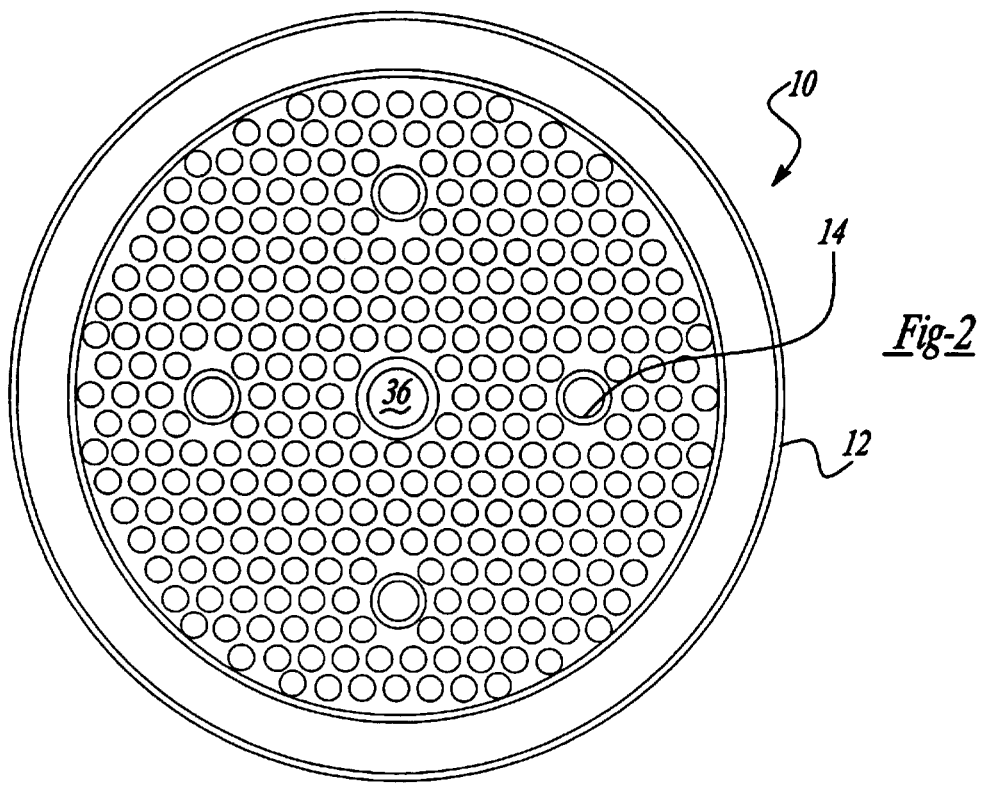
FIG. 2 is a sectional view taken along line 2—2 of FIG. 1.

With reference to FIG. 1, a heat exchanger apparatus 10 is disclosed which comprises a casing 12, having a plurality of tubes 14 contained therein generally extending the length of the casing for retaining the carbonaceous material for treatment. Each tube 14 is provided with an inlet 16 having a valve 18 and an outlet 20 including valve 22. The heat exchanger 10 also includes a network for circulating a heat exchange medium throughout the casing including a plurality of channels 24 generally extending lengthwise within the casing.

As further illustrated in FIG. 1, a vacuum source 26 is generally connected directly to the plurality of tubes 14 for receiving carbonaceous material toward the lower end of the tubes. Also, connected to the plurality of tubes 14, generally near the inlets 16, is a source for injecting either pressurized inert gas and/or steam generally designated by reference number 28. It should be noted at this point that while it is preferred that the apparatus disclosed with reference to FIG. 1 be equipped with a vacuum source 26, it is not considered to be essential under the teachings of the present invention in that the unique application of pressurized gas, steam and the like, offers an improvement in the amount of by-products which are recoverable over the known systems for treating carbonaceous material.

The casing 12 as illustrated in FIG. 1 includes a network for circulating heat exchange medium throughout the heat exchange apparatus. The network includes an inlet 30 located along the lower end for introducing a heat exchange medium into the casing 12. The network also includes an outlet 32 located at the lower end of the casing for removing the heat exchange medium from the casing after circulation therethrough. Ideally, the heat exchange medium will be cycled through a furnace (not shown) to reheat the heat exchange medium prior to reintroduction into the heat exchanger.

To carry out the method of treating the carbonaceous material utilizing the heat exchanger of FIG. 1, carbonaceous material is charged into the plurality of tubes 14 through inlets 16 after closing the valves 22 located along the outlets 20. Upon filling the tubes with the desired amount of carbonaceous material, the valves 18 located along the inlets 16 are closed to maintain the carbonaceous material in a closed system.

A heat exchange medium such as heated gas, molten salt, or preferably an oil, having a temperature of between about 250° F. to 1200° F., and preferably about 750° F., is thereafter continuously circulated throughout the casing by introducing the heat exchange medium through the inlet 30. The heat exchange medium travels upwardly through the well 36 and then back down through the plurality of channels 24. The heat exchange medium then exits the outlet 32 for reheating prior to being reintroduced through inlet 30.

While the heat exchange medium is being circulated throughout the casing 12, a vacuum is optionally, but preferably, applied to the plurality of tubes 14 containing the carbonaceous material. Subsequently, a gas such as an inert gas, carbon dioxide, hydrogen or a combination of such gases is injected into the plurality of tubes 14 such that the gas acts a heat transfer carrier by coming into contact with the inner walls of the tubes 14, absorbing heat and driving the heat into the carbonaceous material. The pressure at which the inert gas, carbon dioxide, and optionally hydrogen, is introduced and maintained within the tubes 14 can range from approximately 2 PSIG to about 3,000 PSIG.

When hydrogen gas is utilized, a stoichiometric amount of hydrogen is injected into the plurality of tubes to assist in driving excessive sulfur out of the carbonaceous material. By "stoichiometric amount," it is meant that the amount of hydrogen employed will be in direct correlation to the amount of sulfur contained in the carbonaceous material. In general, the higher the sulfur content, the more hydrogen required to react therewith giving rise to a hydrogen sulfide gas constituent which can be vented from the plurality of tubes.

As a result of both heat and gravity, the moisture contained in the carbonaceous material evaporates and condenses on subsequent carbonaceous material contained within the plurality of tubes 14 carrying with it the by-products driven from the carbonaceous material. Eventually, substantially all of the water, by-products and particularly a relatively high concentration of sulfur is removed from the carbonaceous material and recovered through the outlets 20 prior to recovering the carbonaceous material.

As previously noted, the amount of time required to treat the carbonaceous material within the heat exchanger apparatus will vary depending upon the size of the granules of carbonaceous material, the temperature at which the system is operated, the pressure of the gas injected into the tubes and the heating volume that is desired. Typically, the amount of time ranges from about 3 minutes to about 30 minutes. The amount of time required for treatment generally decreases as the temperature and pressure within the heat exchanger increase. Conversely, the amount of time required increases when lower temperatures and pressures are utilized.

Under an alternative method of treating the carbonaceous material utilizing the heat exchanger apparatus 10 as illustrated in FIG. 1, after charging the plurality of tubes 14, circulating the heat exchange medium throughout the plurality of channels 24 for an amount of time sufficient to raise the temperature of the carbonaceous material to the desired level and optionally applying the vacuum as described above, steam is injected into the plurality of tubes 24. The steam is injected into the plurality of tubes 14 proximate to the inlet 16 and is maintained at a pressure of between approximately 300 to about 3000 PSIG such that the high pressure steam travels downwardly through the carbonaceous material. As the steam condenses on the carbonaceous material as it travels downwardly within the tubes, the steam serves to purge the material of by-products. After treating the material for a period of time ranging generally from about 3 minutes to about 30 minutes, any gases contained within the tubes 24 are vented and the by-products are removed through outlets 20. Thereafter, the treated carbonaceous material can be removed.

Figure 4:
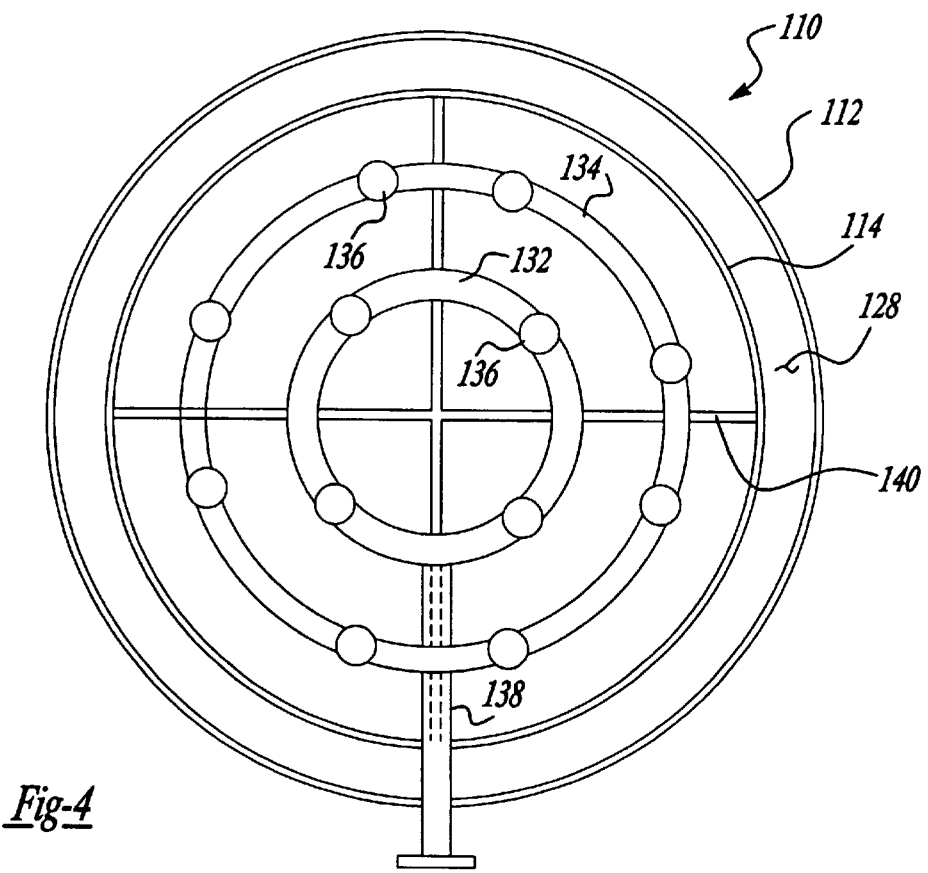
FIG. 4 is a sectional view taken along line 4—4 of FIG. 3.
Figure 3:
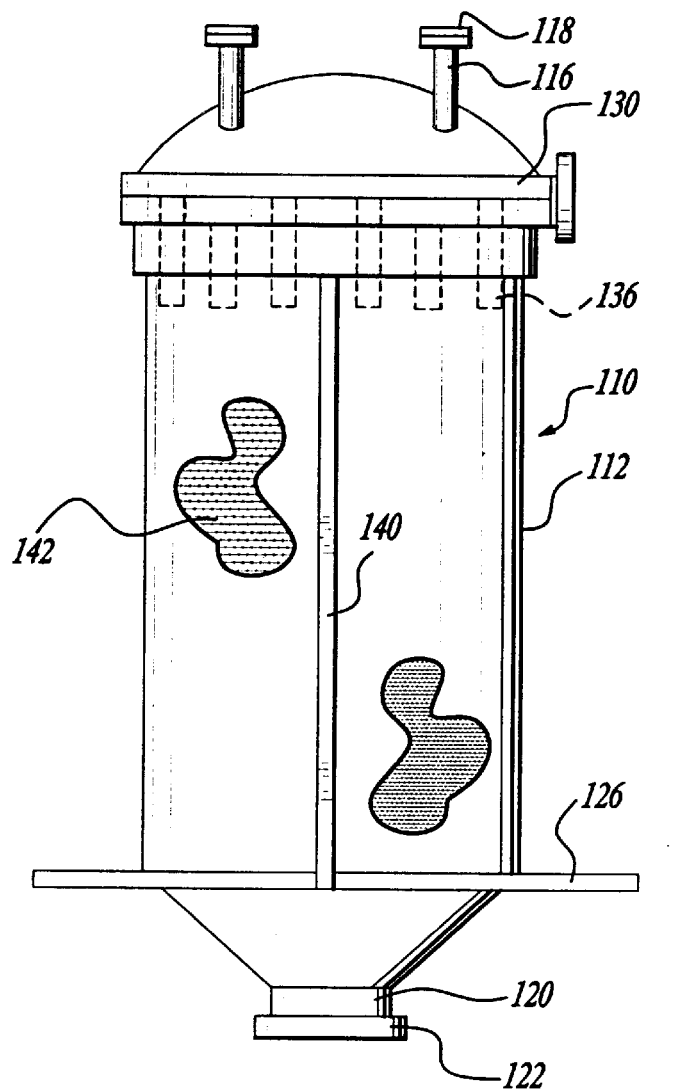
FIG. 3 is a side elevation view partially broken away illustrating a second heat exchanger embodiment according to the teachings of the present invention.
Figure 5:
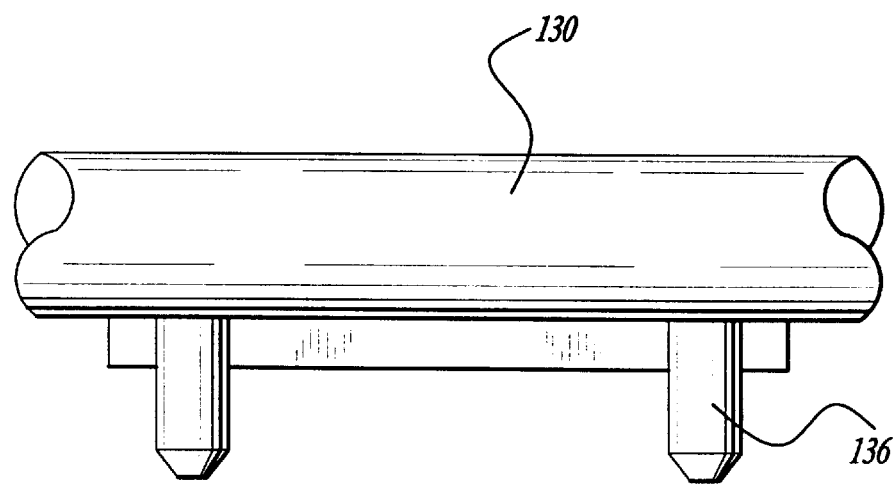
FIG. 5 is a side elevation view showing a portion of the steam injector assembly of the present invention.

Referring now to FIG. 3, an alternative embodiment of a heat exchanger apparatus 110 is disclosed which comprises an outer casing 112 having a relatively cylindrical shaped chamber 114 contained therein as shown more clearly in FIG. 4. The chamber 114 generally extends along a significant length of the casing 112 and serves to retain the carbonaceous material during the treatment process. Internally, the chamber 114 is provided with a divider 140 which separates the chamber into a plurality of elongated sections for segregating the carbonaceous material prior to treatment, each section generally having roughly the same volumetric capacity as any other given section. The heat exchanger 110 also includes one or more inlets 116 having valves 118 for introducing a charge of carbonaceous material into the various sections of the chamber and one or more outlets 120 having valves 122 for removing the carbonaceous material from the heat exchanger after treatment. Located proximate to the lower end of the casing 112 above valve 122 is a valve 126 which is actuable to close off the chamber 114 while treating the carbonaceous material. Preferably, a gap 128 is provided between the inner wall of the casing and the outer wall of the chamber within which insulation material 142 as shown in FIG. 3 is disposed to retain the heat within the heat exchanger.

The heat exchanger apparatus 110 also includes a steam injector 130 disposed along the top of the chamber 114 for introducing steam into the various sections of the chamber. As illustrated most clearly in FIG. 4, the steam injector typically includes an inner ring 132 and an outer ring 134, each of which has a plurality of downwardly extending nozzles 136 for introducing the steam into the various sections of the chamber in an area specific manner. The inner and outer rings are joined by at least one conduit 138 into which the steam is originally introduced.

To carry out the method of treating the carbonaceous material utilized in heat exchanger of FIG. 4, carbonaceous material is charged into the chamber 114 through inlets 116 which feed directly into the chamber after insuring that the valve 126 located at the lower end of the chamber is closed. Upon filling the various sections of the chamber with carbonaceous material, the valves 118 located along the inlets 116 are shut to maintain the carbonaceous material in a closed system within the chamber. Subsequently, steam is introduced through the injector which, in turn, substantially evenly distributes the steam throughout the various sections of the chamber. By distributing the steam evenly throughout each chamber section, the steam is allowed to condense relatively evenly on the carbonaceous material. Ideally, the pressure at which the steam is maintained within the chamber 114 will be on the order of between about 300 PSIG to about 3000 PSIG depending mainly upon the btu requirements for any given charge of carbonaceous material.

As the steam condenses and moves downwardly throughout the carbonaceous material, the divider 140 serves to insure that the amount of condensing steam in any one section is roughly equivalent to that contained in another section. As result of the even distribution of steam throughout the chamber, higher consistency can be achieved with regard to the treated carbonaceous material.

After treating the carbonaceous material for a sufficient amount of time, typically ranging from between about 3 minutes to about 30 minutes, the valves 122 and 126, respectively, are opened to vent any gases such as hydrogen sulfide gas which has been generated as a result of the condensing steam reacting with the carbonaceous material. Further, any by-products in the form of contaminant borne water are also recoverable through valve 126. After the gases and other by-products have been discharged, the carbonaceous material can then be recovered through the one or more outlets 120 provided along the lower end of the heat exchanger apparatus.

The "treated" carbonaceous material produced according to the aforementioned methods, utilizing the apparatuses illustrated in FIGS. 1–5, is subject to both a physical restructuring and a chemical restructuring. By "physical restructuring," it is meant that the average particle size of the carbonaceous material becomes reduced by a factor of approximately twenty-five percent on the average. This reduction in particle size causes the particles to become more dense, thus, allowing the carbonaceous material to burn longer which is highly desirable.

The so-called "chemical restructuring" is most readily evidenced by the gaseous emissions which result from treating the carbonaceous material at elevated temperatures and pressures as described above. In addition to the hydrogen sulfide gaseous by-product, still other gaseous by-products including, but limited to, carbon dioxide, carbon monoxide and methane often result. As evidenced by infrared analysis, in general, the gaseous by-products result from the decarboxylation of the carbonaceous material wherein a significant reduction in the number of carbon-oxygen bonds that form the linkages in the carbonaceous material is experienced. Further, the decomposition of carboxylic acids and phenols are believed to effectuate a reduction in the equilibrium moisture content.

Those skilled in the art should now come to appreciate some of the advantages of the present invention, such as a more consistent treatment of carbonaceous materials and, more particularly, a higher concentration of by-products recovered which, in turn, gives rise to carbonaceous materials having a greater capacity as fuel.

The skilled practitioner will realize still other advantages of the invention after having the benefit of studying the specification, drawings and following claims.

I claim:

1. An apparatus for removing by-products from carbonaceous materials, comprising:

a heat exchanger including an outer casing, an inlet for a charge of carbonaceous material located along a first end of said casing and an outlet located along a second end of said casing, at least one tube member contained within said casing for receiving a charge of carbonaceous material, one or more valves located along said first end for introducing the charge of carbonaceous material into said at least one tube and one or more valves located along said second end for removing the charge of carbonaceous material;

means for circulating a heat exchange medium throughout said outer casing wherein said heat exchange medium is heated to a temperature of between about 250° F. to about 1200°F.;

means for applying a vacuum to said at least one tube containing a charge of carbonaceous material; and means for introducing a treatment medium in the form of steam into said at least one tube containing a charge of carbonaceous material after applying a vacuum to said at least one tube containing the charge of carbonaceous material;

whereby upon applying said vacuum and thereafter introducing said steam, said steam condenses rapidly upon said carbonaceous material thereby speeding the removal of by-products from said carbonaceous material.

2. The apparatus of claim 2, wherein said means for circulating a heat exchange medium throughout said outer casing includes:

a well extending upwardly into said casing from the lower end through which the heat exchange medium is introduced into the casing;

a plurality of downwardly extending channels into which the heat exchange medium flows from said well; and an outlet through which the heat exchange medium exits the apparatus for reheating.

3. An apparatus for removing by-products from carbonaceous material, comprising:

a heat exchanger including an outer casing and an inner chamber, an inlet located along a first end of said casing for introducing a charge of carbonaceous material into said chamber, an outlet located along a second end of said casing for removing said charge of carbonaceous material, valve means operable to close off the chamber for treatment of said carbonaceous material and an elongated divider disposed within said chamber extending substantially between said first end and said second end of said chamber for segregating said chamber into a plurality of elongated sections for containing said carbonaceous material; and means for introducing steam into one or more sections of said chamber wherein said steam is substantially evenly distributed within each section into which it is introduced;

thereby providing for relatively consistent removal of said by-products from said carbonaceous material.

4. The apparatus of claim 3, wherein said divider segregates the chamber into sections having substantially the same volumetric capacity as any other given section.

5. The apparatus of claim 4, wherein said divider serves to preclude the steam introduced into one section from entering another section.

6. The apparatus of claim 3, wherein said means of introducing steam into one or more sections of said chamber includes an injector located along the top of said chamber including an inner ring and an outer ring joined by at least one conduit for introducing steam into said rings, said rings including a plurality of downwardly extending nozzles for introducing steam into said elongated sections in an area specific manner.

7. The apparatus of claim 3, further comprising a gap disposed between said outer casing and said inner chamber which is provided with insulation for retaining heat within said inner chamber.

8. The apparatus of claim 3, further comprising means for applying a vacuum to at least one of said elongated sections for containing said carbonaceous material prior to introducing said steam.

9. A process for removing by-products from carbonaceous materials, comprising the steps of:

(a) providing a heat exchanger having a least one tube contained within an outer casing, an inlet for introducing carbonaceous material into said at least one tube, an outlet for removing said carbonaceous material from said at least one tube and an inlet for introducing steam into said at least one tube;

(b) circulating a heat exchanger medium having a temperature of at least 250° F. throughout said outer casing to effectuate an increase in the temperature of said carbonaceous material;

(c) applying a vacuum to said at least one tube containing carbonaceous material;

(d) injected steam through said inlet into said at least one tube containing carbonaceous material; and (e) recovering the carbonaceous material through said outlet;

whereby upon applying said vacuum and thereafter introducing said steam, said steam condenses rapidly upon said carbonaceous material thereby speeding the removal of by-products from said carbonaceous material.

10. The process as defined in claim 9, wherein the steam introduced into the at least one tube is maintained at between approximately 300 PSIG to about 3,000 PSIG.

11. The process as defined in claim 9, wherein the charge of carbonaceous material remains within said at least one tube during treatment for at least about three minutes.

12. A process for removing by-products from carbonaceous materials, comprising the steps of:

(a) providing a heat exchanger including an outer casing and an inner chamber, an inlet for introducing carbonaceous material into said inner chamber, an outlet for removing carbonaceous material from said chamber, an elongated divider disposed within said inner chamber for segregating the inner chamber into a plurality of elongated sections for containing said carbonaceous material and an injector for introducing steam into one or more sections of said chamber such that said steam is introduced in a substantially even manner in any given chamber section;

(b) introducing carbonaceous material into at least one of said elongated sections;

(c) optionally, applying a vacuum to said at least one elongated chamber containing said carbonaceous material;

(d) introducing steam into one or more sections of said chamber for a sufficient amount of time to effectuate a chemical restructuring of said carbonaceous material such that said by-products are readily removed from the carbonaceous material; and (e) removing the chemically restructured carbonaceous material.

13. The process as defined in claim 12, wherein steam is introduced substantially evenly throughout the entire chamber.

14. The process as defined in claim 12, wherein steam is introduced into said one or more sections at a desired temperature and pressure for at least about three minutes.

15. The process as defined in claim 12, wherein a gap is provided between said outer casing and said inner chamber for containing insulation which serves to retain heat within said inner chamber.

* * * * *